US008680162B2

(12) United States Patent
Van De Loosdrecht et al.

(10) Patent No.: US 8,680,162 B2
(45) Date of Patent: Mar. 25, 2014

(54) CATALYSTS

(75) Inventors: Jan Van De Loosdrecht, Sasolburg (ZA); Willem Adriaan Booysen, Goor (NL)

(73) Assignee: Sasol Technology (Proprietary) Limited, Johannesburg (ZA)

( * ) Notice: Subject to any disclaimer, the term of this patent is extended or adjusted under 35 U.S.C. 154(b) by 261 days.

(21) Appl. No.: 13/139,598

(22) PCT Filed: Nov. 13, 2009

(86) PCT No.: PCT/IB2009/055055
§ 371 (c)(1),
(2), (4) Date: Jun. 14, 2011

(87) PCT Pub. No.: WO2010/070475
PCT Pub. Date: Jun. 24, 2010

(65) Prior Publication Data
US 2011/0245355 A1 Oct. 6, 2011

(30) Foreign Application Priority Data

Dec. 15, 2008 (ZA) ................................. 2008/10615

(51) Int. Cl.
*C07C 27/00* (2006.01)
*B01J 20/34* (2006.01)
(52) U.S. Cl.
USPC .............................. 518/700; 502/22; 502/34
(58) Field of Classification Search
USPC ....................................... 518/700; 502/22, 34
See application file for complete search history.

(56) References Cited

U.S. PATENT DOCUMENTS

| 5,351,749 A | 10/1994 | Lai et al. |
| 5,585,316 A | 12/1996 | Nay et al. |
| 2002/0183403 A1 | 12/2002 | Huang et al. |
| 2006/0073083 A1 | 4/2006 | Beech |

FOREIGN PATENT DOCUMENTS

| EP | 0304523 A1 | 3/1989 |
| EP | 1400282 A2 | 3/2004 |

OTHER PUBLICATIONS

European Patent Office PCT International Search Report, International Application PCT/IB2009/055055, mailed May 4, 2010.
European Patent Office PCT Written Opinion of the International Searching Authority, International Application PCT/IB2009/055055, mailed May 4, 2010.
European Patent Office PCT International Preliminary Report on Patentability, International Application PCT/IB2009/055055, mailed May 4, 2010.

*Primary Examiner* — Jafar Parsa
(74) *Attorney, Agent, or Firm* — Fellers, Snider, Blankenship, Bailey & Tippens, P.C.

(57) ABSTRACT

A process for regenerating a spent particulate wax-containing cobalt-based Fischer-Tropsch synthesis catalyst is provided. The process includes subjecting the spent wax-containing catalyst sequentially to a dewaxing treatment, an oxidation treatment and a reduction treatment. During the dewaxing treatment, the spent wax-containing catalyst is at least partially dewaxed, with dewaxed catalyst particles being produced. During the oxidation treatment, an oxygen-containing gas is passed through a bed of the dewaxed catalyst particles at an operating temperature T° C. where 150<T<450, and the operating temperature is controlled by removing heat from the catalyst particle bed using a cooling device, to obtain oxidized catalyst particles. During the reduction treatment, the oxidized catalyst particles are reduced, thereby regenerating the catalyst.

15 Claims, 4 Drawing Sheets

CATALYSTS

FIELD OF THE INVENTION

THIS INVENTION relates to catalysts. It relates in particular to a process for regenerating a spent particulate wax-containing cobalt-based Fischer-Tropsch synthesis ('FTS') catalyst, and to a Fischer-Tropsch synthesis process.

BACKGROUND ART

FTS is an integral part of the Gas-To-Liquids, Coal-To-Liquids and Biomass-To-Liquids processes in which natural gas, coal or biomass respectively is converted, by means of three main process steps, into liquid transportation fuels and/or chemicals. The three steps are (i) natural gas, coal or biomass conversion into synthesis gas, i.e. a mixture of carbon monoxide and hydrogen, (ii) FTS which converts the synthesis gas mainly into hydrocarbon compounds often including waxy organic compounds, and (iii) processing of the hydrocarbon compounds to produce liquid transportation fuels and/or chemicals, especially by hydroprocessing of the waxy organic compounds. For a slurry phase FTS reaction to produce waxy organic compounds, a cobalt based catalyst is immersed in the synthesized waxy compounds inside a three phase slurry bed reactor.

When cobalt-based Fischer-Tropsch synthesis catalysts are used in FTS, including slurry phase Fischer-Tropsch synthesis, they partially lose activity over time, so that the catalysts thus become spent. Spent cobalt-based Fischer-Tropsch synthesis catalysts can be regenerated which will recover, to a large extent, the FTS performance of the spent catalyst. Regeneration can be executed outside the FTS process by sequentially subjecting the spent catalyst to dewaxing, oxidation and reduction.

GB 2 222 531 dealing with the regeneration of a fixed bed Fischer-Tropsch catalyst that was used for the preparation of hydrocarbons by catalytic reaction of carbon monoxide with hydrogen, acknowledges the fact that temperature control is important during regeneration of a spent catalyst with oxygen. Its solution to this issue is (i) to remove the excess hydrocarbons by means of a solvent wash step prior to the oxidation of the catalyst, and (ii) to perform the oxidation at low oxygen concentrations, i.e. 0.1-3 vol %. The drawback of using low oxygen concentrations is the extended cycle time of the oxidation process. By cycle time is meant the length of time it takes to complete the oxidation process.

WO 02/085508 deals with the regeneration of cobalt based Fischer-Tropsch catalysts that were used in slurry phase Fischer-Tropsch synthesis processes. The spent catalyst is removed from the Fischer-Tropsch reactor; de-waxed and dried to produce a free flowing powder; oxidized with oxygen, typically in a fluidized bed, to remove hydrocarbons and carbonaceous materials; the catalyst reduced; and the catalyst powder re-slurried to obtain a regenerated slurry catalyst. The oxygen treatment has the following objectives: (i) removing the hydrocarbons and carbonaceous materials, and (ii) oxidizing the reduced cobalt to cobalt oxide. Additionally, unwanted temperature excursions due to the exothermic nature of the above-mentioned objectives, must be minimized. Minimizing the exothermic reactions is done by performing the oxidation at low oxygen concentrations and low heating rates. The drawback of using low oxygen concentrations and low heating rates is the extended cycle time of the oxidation process.

Spent cobalt Fischer-Tropsch catalysts can thus be regenerated. To speed up the oxidation step, as part of the regeneration process, and to decrease the cycle time, high oxygen concentrations should be used. It is, however, difficult to control the catalyst temperature during the oxidation, and the catalyst temperature can rise to unacceptably high levels, resulting in failure to recover catalyst activity sufficiently and damage to the regeneration equipment. The uncontrolled temperature rise also poses a safety risk in a commercial regeneration facility. This is even more important when high oxygen concentrations are used.

It is thus an aim of this invention to provide a process for regenerating a spent cobalt-based Fischer-Tropsch synthesis catalyst whereby this problem is at least alleviated.

As indicated above, it is important to be able to control the exothermic reaction during the oxidation treatment. The Applicant is aware that the catalyst temperature during the oxidation treatment can be controlled by using diluted oxygen, e.g. 3 vol % oxygen in nitrogen, thereby limiting the rate at which heat is generated. However, when moving to higher oxygen concentrations during the oxidation treatment, which is desirable in order to reduce the time taken for the oxidation treatment, it was found that it is difficult to control the catalyst bed temperature. Thus, for example, when the oxidation treatment is performed at oxygen levels representative of air, i.e. around 21 vol %, it was found that satisfactory control of the catalyst bed temperature was not achieved.

DISCLOSURE OF THE INVENTION

Thus, according to a first aspect of the invention, there is provided a process for regenerating a spent particulate wax-containing cobalt-based Fischer-Tropsch synthesis catalyst, which process includes subjecting the spent wax-containing catalyst sequentially to (i) a dewaxing treatment during which the spent wax-containing catalyst is at least partially dewaxed, with dewaxed catalyst particles being produced;

(ii) an oxidation treatment which comprises passing an oxygen-containing gas through a bed of the dewaxed catalyst particles at an operating temperature T° C. where 150<T<450, and controlling the operating temperature by removing heat from the catalyst particle bed using a cooling device, to obtain oxidized catalyst particles; and (iii) a reduction treatment which comprises reducing the oxidized catalyst particles, thereby regenerating the catalyst.

A spent Fischer-Tropsch synthesis catalyst is a catalyst which has lost at least some activity over time due to the use thereof in FTS.

Thus, a spent particulate wax-containing cobalt-based Fischer-Tropsch synthesis catalyst may be a supported cobalt catalyst which has been used in a FTS process for producing wax, and has thus been immersed in wax. The FTS process for producing wax preferably is a slurry phase FTS process.

The oxidation treatment may be such that cobalt compounds or complexes in the dewaxed catalyst particles are oxidized to cobalt oxide, CoO. Additionally, the oxidation treatment may be such that residual wax still present on the dewaxed catalyst particles is removed. The reduction treatment may be such that the cobalt oxide is reduced to Co(0), i.e. Co zero or metallic cobalt.

The operating temperature, that is, the operating bed temperature, T° C. may be from 200° C. to 350° C., e.g. about 300° C.

When the oxidation treatment commences, the dewaxed catalyst particle bed may thus already be at its operating temperature T° C., e.g. as a result of the particular dewaxing treatment used or as a result of heat imparted to the catalyst particles during, or subsequent to, the dewaxing treatment.

However, it is expected that the dewaxed catalyst particle bed will more usually be at a temperature below its operating temperature T° C., and the process may thus include, when necessary, heating up the catalyst particle bed to its operating temperature T° C. while passing the oxygen-containing gas through the bed. In the event that the catalyst particles, after dewaxing, are at a temperature above the operating temperature T° C., the catalyst bed will naturally be cooled down, for example by means of the cooling device, to the operating temperature, and then controlled at the operating temperature, Thus, the catalyst particle bed may be at a temperature above room temperature but below its operating temperature T° C., typically at between 25° C. and 400° C., e.g. between 25° C. and 150° C., at commencement of the oxidation treatment. The commencement temperature may be dictated by the dewaxing treatment used. For example, when the dewaxing treatment comprises solvent washing of the wax-containing catalyst, as also hereinafter described, then the catalyst particle bed may be at a temperature between 25° C. and 150° C., at commencement of the oxidation treatment, i.e. when heating of the bed commences.

When the dewaxing treatment comprises hydrogenolysis as also hereinafter described, then the catalyst particle bed temperature may also be above room temperature, typically at between 25° C. and 400° C., at commencement of the oxidation treatment, i.e. when heating of the bed commences.

When heating of the catalyst particle bed is required to reach the operating temperature T° C., at least a portion of the heat required to heat up the catalyst particle bed is derived from the oxidation reaction by means of which the catalyst particles are oxidized during the oxidation treatment. However, more typically, the heat required to heat up the catalyst particle bed is derived from both the oxidation of the catalyst particles and from additional heat imparted to the catalyst particle bed, e.g. by pre-heating the oxygen-containing gas before it passes into the catalyst particle bed, by temporarily using the cooling device as a heating device, e.g. by passing a heating medium through the cooling device, or by using external electric heating. As the catalyst particle oxidation reaction is exothermic, heat has to be removed by means of the cooling device, particularly once the operating temperature T° C. has been reached. Additionally, any pre-heating of the oxygen-containing gas must then be stopped or at least reduced. When the exothermic reaction starts slowing down, then the cooling has to be reduced or even stopped and additional heating of the particles has to start again to maintain the operating temperature T° C. When pre-heating of the oxygen-containing gas is used, it may be heated up to a temperature above that of the catalyst bed, e.g. to a temperature about 50° C. higher than the catalyst bed temperature.

Controlling the temperature of the catalyst particle bed by removing heat therefrom is thus necessary, in order to control the bed operating temperature at between 150° C. and 450° C. However, it is believed that removing heat from the catalyst particle bed during the heating up of the catalyst particle bed has a subsidiary benefit in that this heat removal assists in controlling the catalyst bed heating rate within acceptable levels, thereby avoiding or limiting damage to the catalyst particles which could result from excessively high heating rates. The heating rate should thus not exceed 10° C./min, and typically is from about 0.5 to 3° C./min.

The cooling device may comprise cooling medium passage means and a cooling medium passing through the passage means, thereby providing heat transfer surfaces located in and/or around the catalyst bed. The cooling medium will thus absorb heat from the catalyst particles by heat transfer through the heat transfer surfaces, thereby controlling the temperature of catalyst particles, and hence the catalyst bed, during the exothermic oxidation of the catalyst particles. The passage means thus ensures that the cooling medium is not brought into direct contact with the catalyst particles. The cooling medium may be a liquid, for example liquid water or a heat transfer fluid such as that available under the trade mark Dowtherm A, or a gas, for example nitrogen gas ($N_2$). The passage means may be, or may include, one or more tubes, for example, serpentine coils, boiler tubes, coiled tubes or finned tubes, or may be, or may include, two or more plates defining between them a cooling medium passage, e.g. a dimpled plate heat exchanger. Another option would be to use a conventional multi-tubular heat exchange arrangement with the catalyst bed outside the tubes and the cooling medium inside the tubes. The cooling device may include a jacket around the bed and through which cooling medium is passed.

Sufficient of the oxygen-containing gas may be used, and it may be passed through the bed at a sufficient velocity, so that the catalyst particle bed is fluidized. Thus, the oxidation treatment may comprise subjecting the dewaxed catalyst particles to oxidation, at elevated temperature, by fluidizing them by means of the oxygen-containing gas, thereby to oxidize the catalyst particles. More particularly, the dewaxed catalyst particles may be subjected to fluidization in a reaction chamber, using a space velocity of from 100 to 20000 $ml_n$ gas/g catalyst/hour, typically of about 200 to 3000 $ml_n$ gas/g catalyst/hour. Preferably, the said space velocity is constant. The heating rate of the catalyst particles during the heating up of the catalyst bed, may be from 0.1 to 10° C./min, typically from about 0.5 to 3° C./min, up to the operating temperature T° C.

The oxidation treatment thus includes, in addition to heating (when required) the catalyst particles, i.e. the catalyst particle bed, up to the operating temperature T° C., maintaining or controlling the catalyst particle bed at T° C. for a period of time. Maintaining of the catalyst particle bed at T° C. for this period of time includes, when necessary, removing heat from the catalyst particle bed by means of the cooling device and/or, when necessary, heating the catalyst particle bed, e.g. by using additional heat as hereinbefore described. During this period of time, T° C. may be controlled or maintained within a range of 40° C., preferably in a range of 20° C. The period of time may be from 0.1 to 24 hours, typically about 0.1 to 15 hours.

The pressure at which the oxidation is performed may be between 1 and 20 bar(a), i.e. 100 and 2000 kPa(a), preferably between 1 and 11 bar(a), i.e. 100 and 1100 kPa(a).

During the oxidation treatment, passage of the oxygen-containing gas through the catalyst particle bed preferably is on a continuous basis. During the heating up of the catalyst particle bed to the operating temperature T° C., heating by means of the exothermic oxidation reaction can be continuous, or intermittent, as required. Likewise, heating by means of the additional heat can be continuous, or intermittent, as required. If necessary, heating by both the exothermic oxidation reaction and the additional heat can be employed, either intermittently or continuously as required. While maintaining or controlling the catalyst particle bed operating temperature at about T° C., heating of the catalyst particle bed by means of the exothermic oxidation reaction could be continuous, but will normally be intermittent depending on the degree of reaction; likewise, the heating up of the bed using additional heat could then be continuous but will normally be intermittent, being employed only to the extent necessary to maintain the operating temperature at T° C. Controlling of the catalyst bed temperature by the removal of heat from the catalyst particle bed by means of the cooling device may thus be effected during both the heating up of the catalyst particle bed to T° C., and the maintaining of the catalyst particle bed at T° C., and may be effected either continuously or intermittently, i.e. from time to time, as required to control or maintain the catalyst particle bed temperature at T° C.

The oxygen-containing gas may be a gas containing 21 vol % oxygen, and preferably it is then air. Instead, the oxygen-containing gas may contain less than 21 vol % oxygen, such as diluted air, for example air containing 0.1 vol % to 20 vol % oxygen. Preferably the oxygen-containing gas then contains more than 3% vol oxygen, preferably more than 5 vol % oxygen, and still more preferably more than 10 vol % oxygen, but less than 21 vol % oxygen. Furthermore, the oxygen-containing gas may be enriched in oxygen, thus containing 21 to 100 vol % oxygen. The oxygen level can also be varied during the oxidation procedure, starting at a low oxygen concentration, e.g. about 1 vol %, and increasing it relatively quickly, e.g. to about 21 vol % or even more. Using air as the oxygen-containing gas is the preferred option.

If necessary, i.e. if further regeneration of the catalyst is required, the process may include subjecting the catalyst to at least one further regeneration cycle comprising a further oxidation treatment and preferably a further reduction treatment. Thus, the process may then include subjecting the regenerated catalyst to at least one further regeneration cycle comprising an oxidation treatment which comprises, while passing an oxygen-containing gas through a bed of the catalyst particles, heating the catalyst particle bed up to an operating temperature T° C. where 150<T<450, and controlling the temperature of the catalyst particle bed by removing heat from the catalyst particle bed using a cooling device, to obtain oxidized catalyst particles, and preferably a reduction treatment which comprises reducing the oxidizing catalyst particles, thereby further regenerating the catalyst.

The dewaxing treatment may include hydrogenolysis; solvent wash or extraction; solvent wash or extraction followed by hydrogenolysis; drying (such as vacuum drying) or stripping in an inert medium. This treatment normally results in a dewaxed catalyst that is in the form of a dry powder.

Thus, for example, the dewaxing treatment may include subjecting the spent wax-containing catalyst to wax extraction using a suitable solvent, such as heptane, octane, dodecane, xylene, or even a Fischer-Tropsch synthesis hydrocarbon fraction like diesel or a $C_{10}$-$C_{12}$ paraffin fraction, preferably at an elevated temperature between 50° C. and 150° C.

By hydrogenolysis of the spent wax-containing or wax-coated catalyst is meant a treatment thereof at an elevated temperature, e.g. 200° C. to 400° C., in a hydrogen containing atmosphere. This treatment will remove a large portion of the wax. The hydrogen containing atmosphere is preferably pure hydrogen.

Extraction can, for example, be done by means of supercritical carbon dioxide extraction at temperatures in excess of 31° C. and a pressure in excess of 73 bar(a), i.e. 7300 kPa(a).

Drying, vacuum drying or stripping involves the treatment of the spent wax coated catalyst at an elevated temperature, e.g. 150° C. to 400° C. in an inert atmosphere, e.g. under nitrogen, or under vacuum.

After the dewaxing treatment and before the oxidation treatment, the process may include passivating the catalyst. Passivation is oxidizing the outer cobalt layer to make the material safe to handle. If the cobalt catalyst can be transported safely from the dewaxing equipment into the oxidation equipment then the passivation treatment is typically not required.

The reduction treatment may comprise any reduction procedure known in the prior art. It would normally be a reduction procedure in hydrogen-containing gas, preferably at elevated temperatures and preferably at atmospheric or elevated pressures. In a particular embodiment, the catalyst reduction may be effected in the manner described in EP 1444040 B1 or ZA 2007/03621 which are hence incorporated herein by reference.

The regenerated catalyst may be coated with a coating medium to protect the reduced catalyst particles against oxidation. The coating medium may be an organic substance, preferably a wax.

The particulate cobalt-based Fischer-Tropsch synthesis catalyst may be one that is prepared by means of techniques known in the art, e.g. impregnation, such as slurry impregnation or incipient wetness impregnation, followed by drying, calcination and reduction.

The cobalt Fischer-Tropsch synthesis catalyst may, in particular, be one that is obtained by forming a slurry of a particulate catalyst support, a cobalt compound as an active component precursor, and water; subjecting the catalyst support to impregnation with the cobalt compound; drying the impregnated catalyst support, calcining the impregnated support to obtain a catalyst precursor; and reducing the catalyst precursor, to obtain an active cobalt Fischer-Tropsch synthesis catalyst. Naturally, this catalyst is then used for Fischer-Tropsch synthesis and during such synthesis it thus becomes deactivated or spent, and then requires regeneration in accordance with the invention.

The cobalt Fischer-Tropsch synthesis catalyst may instead be prepared by using organic cobalt compounds or mixtures of inorganic cobalt compounds and organic compounds that do not contain cobalt. The organic compounds, for example sugar, polyols or carboxylic acids, may then be added during the catalyst preparation process. When organic (cobalt containing) compounds are used in the catalyst preparation procedures, and these have to be calcined/oxidized this may also lead to an exothermic reaction during calcination. If these exothermic reactions do occur in the fresh catalyst manufacturing process then the heat removal can be executed in the same manner as described above for the oxidation of spent catalysts.

The spent particulate wax-containing cobalt-based Fischer-Tropsch synthesis catalyst thus comprises a particulate catalyst support, Co supported on the catalyst support and wax.

The catalyst may contain from 5 to 70 g Co/100 g catalyst support, preferably from 20 to 40 g Co/100 g catalyst support.

The catalyst may also include a dopant capable of enhancing the reducibility of the active catalyst component. The dopant may be a metal selected from the group including palladium (Pd), platinum (Pt), ruthenium (Ru), rhenium (Re) and a mixture of one or more thereof. The mass proportion of the metal dopant (especially palladium metal or platinum metal) to the active component metal (especially cobalt metal) may be from 0.01:100 to 3:100.

The particulate catalyst support may have an average particle size of between 1 and 500 micrometers, preferably between 10 and 250 micrometers, still more particularly between 45 and 200 micrometers.

The catalyst support may comprise a catalyst support basis and optionally one or more modifying components. The catalyst support basis may be selected from the group consisting of alumina, preferably alumina in the form of one or more aluminium oxides; silica ($SiO_2$); titania ($TiO_2$); magnesia (MgO); zinc oxide (ZnO); and mixtures thereof. Preferably, the support basis is selected from the group consisting of alumina in the form of one of more aluminium oxides; titania ($TiO_2$) and silica $SiO_2$. More preferably, the support basis is alumina in the form of one or more aluminium oxides. The support basis may be a commercially available product, for example Puralox (trade name) (available from Sasol Germany GmbH).

Preferably, the catalyst support includes one or more modifying components. This is particularly the case where the support basis is soluble in a neutral and/or an acidic aqueous solution, or where the support basis is susceptible to hydrothermal attack as described below.

The modifying component may comprise a component that results in one or more of the following when incorporated into the support basis:
  (i) decreasing the dissolution of the catalyst support in an aqueous environment;
  (ii) suppressing the susceptibility of the catalyst support to hydrothermal attack (especially during Fischer-Tropsch synthesis);
  (iii) increasing the pore volume of the catalyst support;
  (iv) increasing the strength and/or attrition and/or abrasion resistance of the catalyst support.

In a preferred embodiment of the invention, the modifying component decreases the dissolution of the catalyst support in an aqueous environment and/or suppresses the susceptibility of the catalyst support to hydrothermal attack (especially during Fischer-Tropsch synthesis). Such an aqueous environment may include an aqueous acid solution and/or an aqueous neutral solution, especially such an environment encountered during an aqueous phase impregnation catalyst preparation step. Hydrothermal attack is considered to be the sintering of the catalyst support (for example aluminium oxide) during hydrocarbon synthesis, especially Fischer-Tropsch synthesis, due to exposure to high temperature and water.

The modifying component may include or consist of Si, Zr, Co, Ti, Cu, Zn, Mn, Ba, Ni, Na, K, Ca, Sn, Cr, Fe, Li, Ti, Sr, Ga, Sb, V, Hf, Th, Ce, Ge, U, Nb, Ta, La and mixtures of two or more thereof.

More particularly, the modifying component may be selected from the group consisting of Si; Zr; Cu; Zn; Mn; Ba; La; Ni and mixtures of two or more thereof. Preferably, the modifying component is selected from the group consisting of Si and Zr. In a preferred embodiment of the invention, the modifying component is Si.

In one embodiment of the invention, the catalyst support may comprise a catalyst support basis optionally including a modifying component selected from Si and Zr, and with the catalyst support basis being selected from the group consisting of alumina in the form of one or more aluminium oxides; silica ($SiO_2$) and titania ($TiO_2$) Preferably, the catalyst support basis is the alumina in the form of one or more aluminium oxides, and preferably it includes a modifying component which is preferably selected from Si and Zr, more preferably Si. In another embodiment of the invention, the catalyst support may be selected from alumina in the form of one or more aluminium oxides, silica ($SiO_2$), titania ($TiO_2$), magesia (MgO), silica modified aluminium oxide, and mixtures thereof. Preferably, the support is then a silica modified aluminium oxide, for example the product obtainable under the trademark Siralox from Sasol Germany GmbH. Siralox is a spray-dried silica containing aluminium oxide support. The silica modified aluminium oxide support may be the product described in U.S. Pat. No. 5,045,519 which is incorporated herein by reference.

The one or more aluminium oxides may be selected from the group including or, preferably, consisting of, gamma alumina, delta alumina, theta alumina and a mixture of two or more thereof. Preferably, the group includes, or, preferably, consists of gamma alumina, delta alumina and a mixture of gamma alumina and delta alumina. The aluminium oxide catalyst support basis may be that obtainable under the trademark Puralox, preferably Puralox SCCa2/150 from SASOL Germany GmbH. Puralox SCCa 2/150 (trademark) is a spray-dried aluminium oxide support consisting of a mixture of gamma and delta aluminium oxide.

The aluminium oxide is preferably a crystalline compound complying with the formula $Al_2O_3 \cdot xH_2O$ where $0<x>1$. The term "aluminium oxide" thus excludes $Al(OH)_3$ and AlO(OH), but includes compounds such as gamma, delta and theta alumina.

In one embodiment of the invention, a catalyst support comprising one or more aluminium oxides or a silica modified aluminium oxide is preferred over supports comprising silica and titania, since it is believed that such supports provide a much more attrition resistant catalyst than do silica or titania-based supports. The catalyst support comprising one or more aluminium oxides or a silica modified aluminium oxide may also include La. It is believed that La improves attrition resistance.

In one embodiment of the invention, a catalyst support comprising one or more aluminium oxides or a silica modified aluminium oxide may include titanium, preferably in an amount, expressed as elemental titanium, of at least 500 ppm by weight, preferably from about 1000 ppm to about 2000 ppm by weight. It is believed that the addition of the titanium increases the activity of a catalyst formed from such a support, especially in the case of a cobalt FT catalyst, particularly when no noble metal promoters and preferably no Re or Te promoters are present in the catalyst. Preferably, the titanium is then included in the internal structure of the support. It is then also preferred that no titanium be deposited onto the support outer surfaces. It is believed that the addition of this titanium in the support also improves the attrition resistance of a catalyst formed from such a support.

The catalyst support may be a porous support.

In one embodiment of the invention, the catalyst support may comprise porous particles coated with carbon. In an alternative embodiment of the invention, the porous particles may be free of such a carbon coating.

Fischer-Tropsch synthesis typically includes contacting a synthesis gas comprising hydrogen ($H_2$) and carbon monoxide (CO) at an elevated temperature of at least 180° C. and at an elevated pressure of at least 10 bar with an activated cobalt Fischer-Tropsch catalyst, using a slurry phase Fischer-Tropsch reaction of the hydrogen with the carbon monoxide. Thus, the spent particulate wax-containing cobalt-based Fischer-Tropsch synthesis catalyst is typically a spent slurry phase Fischer-Tropsch catalyst.

Thus, according to a second aspect of the invention, there is provided a Fischer-Tropsch synthesis process comprising regenerating a spent particulate wax-containing cobalt-based Fischer-Tropsch synthesis catalyst according to the process of the first aspect of the invention to obtain a regenerated particulate cobalt-based Fischer-Tropsch synthesis catalyst; and contacting hydrogen with carbon monoxide at a temperature above 100° C. and at a pressure of at least 10 bar in the presence of the regenerated particulate cobalt-based Fischer-Tropsch synthesis catalyst thereby producing hydrocarbons and, optionally, oxygenates of hydrocarbons.

The temperature at which the Fischer-Tropsch synthesis process is effected may be from 180° C. to 250° C., preferably from 200° C. to 230° C. The pressure at which the Fischer-Tropsch synthesis process is effected may be from 10 to 40 bar, i.e. 1000 to 4000 kPa.

Preferably, the Fischer-Tropsch synthesis process is a three phase Fischer-Tropsch process. More preferably, it is a slurry bed Fischer-Tropsch process for producing a wax product.

The process may include subjecting the hydrocarbons and, if present, the oxygenates of hydrocarbons, to hydroprocessing, thereby to covert them to liquid fuels and/or to chemicals.

The invention will now be described in more detail with reference to the following non-limiting examples and the accompanying diagrammatic drawings.

DETAILED DESCRIPTION OF THE DRAWINGS

Figure 1:
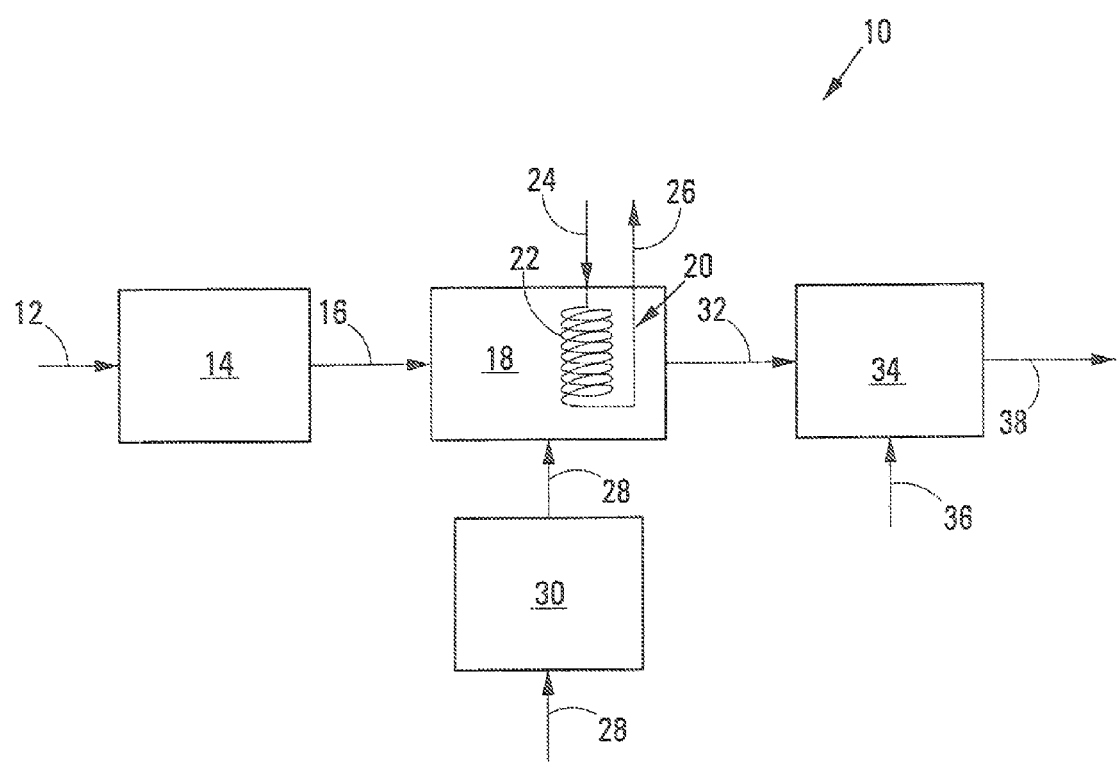
FIG. 1 shows a simplified flow diagram of a process according to the invention for regenerating a spent particulate wax-containing cobalt-based Fischer-Tropsch synthesis catalyst.

Referring to FIG. 1, reference numeral 10 generally indicates a process according to the invention for regenerating spent particulate wax-containing cobalt-based Fischer-Tropsch synthesis catalysts.

The process 10 includes a dewaxing stage 14, with a spent wax-containing catalyst feed line 12 leading into the stage 14.

A dewaxed catalyst transfer line 16 leads from the stage 14 to a fluidized bed reactor stage 18. The stage 18 is fitted with a cooling device, generally indicated by reference numeral 20. The cooling device comprises a coil 22 having an inlet portion 24 which is connected to a cooling water supply, and a steam outlet portion 26 leading from the stage 18. The coil 22 is positioned such that it is normally located within a fluidized bed of dewaxed catalyst particles contained within the stage 18. An air line 28 leads into the stage 18, and is fitted with heating means 30 by means of which it can be heated up.

An oxidized catalyst transfer line 32 leads from the stage 18 to a reduction stage 34, with a regenerated catalyst withdrawal line 38 leading from the stage 34. A hydrogen line 36 leads into the stage 18.

In use, spent particulate wax-containing cobalt-based Fischer-Tropsch synthesis catalyst particles enter the dewaxing stage 14 along the line 12. In the dewaxing stage 14, they are subject to dewaxing or wax extraction using xylene, at an elevated temperature of about 100° C. The hot dewaxed catalyst particles pass from the stage 14 along the line 16 into the fluidized bed reactor stage 18. Air, typically heated to about 350° C. by the heating means 30, enters the stage 18 along the line 28 in a sufficient quantity and at a sufficient velocity so that a fluidized bed of dewaxed catalyst particles forms in the stage 18. As indicated hereinbefore, the cooling coil 22 will be immersed in the bed. The dewaxed catalyst particles are thus subjected to oxidation treatment in the stage 18. During this treatment, and while the heated air passes through the stage 18, the fluidized catalyst particle bed is heated up to an operating temperature of about 300° C. The oxidation reaction of the catalyst particles is exothermic and this heat, together with heat from the heated air, serves to heat up the catalyst particle bed at a heating rate of, typically, 1° C./min until the operating temperature of 300° C. is reached. Once the operating temperature of 300° C. has been reached, the catalyst particle bed is maintained at this temperature for a period of time, i.e. for a hold time. The total oxidation treatment time, including the hold time, is typically 10 to 15 hours. During the hold time, the operating temperature is controlled within a 40° C. range, i.e. 300° C.±20° C. During the oxidation treatment in the reactor 18, air is continually passed through the catalyst bed, thereby maintaining the fluidized bed at all times. However, heat removal by means of the cooling coil 22 and the heating of the air 28 by means of the heating means 30 is only used intermittently as desired, to reach the operating temperature of 300° C. (and to maintain the heating rate of 1° C./min) and then to maintain or control the temperature at 300° C. until the oxidation is completed.

The oxidized catalyst particles pass along the line 32 into the reduction stage 34. After allowing the particles to cool to room temperature, they are reduced, in the stage 34, in hydrogen at atmospheric pressure using a heating rate of 1° C./min from room temperature to 425° C. and kept at 425° C. for 8 hours. Typically, the hydrogen space velocity is 1500 ml$_n$/g cat/h. The reduced or activated catalyst is then cooled down to 140° C. and poured into molten wax, with the molten wax/catalyst mixture being cooled down to room temperature and then being withdrawn along the line 38.

Figure 2:
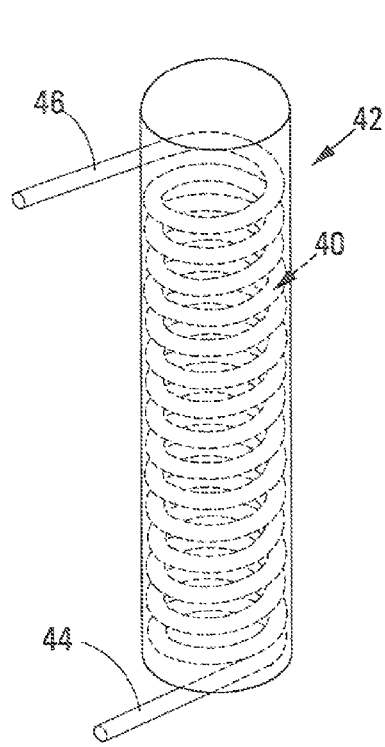
FIG. 2 shows a three-dimensional view of a 6 mm copper tubing cooling coil used to remove heat from the catalyst particle bed in Examples 3 and 4 and which is similar to the cooling device shown in FIG. 1.

Referring to FIG. 2, reference numeral 40 generally indicates a cooling device in the form of a 6 mm (nominal diameter) copper tubing cooling coil used to remove internal heat from the dewaxed catalyst particle bed (not shown) in Examples 3 and 4 and which is similar to the cooling device 20 of FIG. 1.

The coil 40 was housed within a shell 42 which also contained the dewaxed catalyst particle bed. The coil 40 was thus immersed in the catalyst particle bed.

The coil 40 had a water inlet portion 44 and a steam outlet portion 46.

Figure 3:
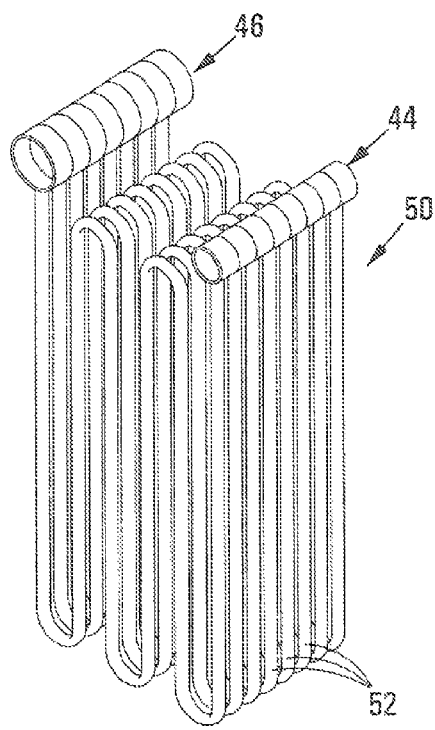
FIG. 3 shows a three-dimensional view of a serpentine cooling coil that can be used to remove heat from a catalyst particle bed, in accordance with the invention.
Figure 4:
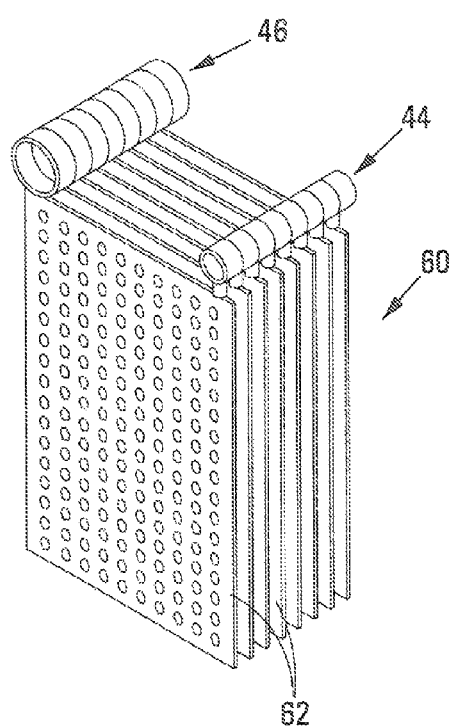
FIG. 4 shows a three-dimensional view of a composite dimple plate cooling device or exchanger that can be used to remove heat from a catalyst particle bed, in accordance with the invention.
Figure 5:
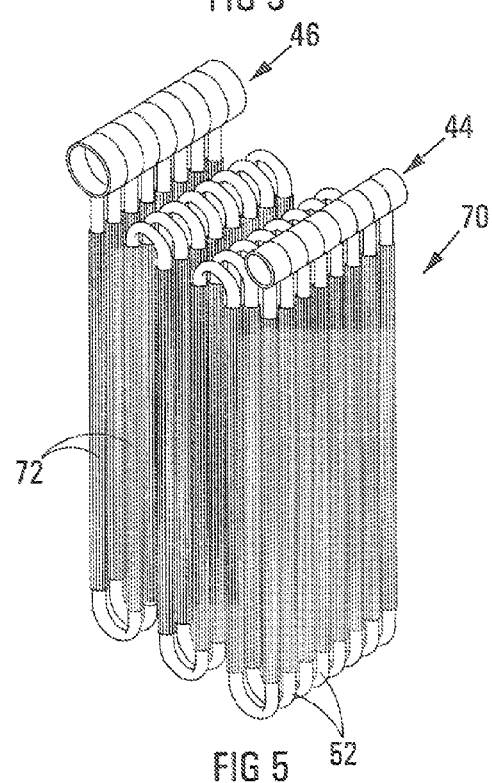
FIG. 5 shows a three-dimensional view of a finned tube cooling device or exchanger that can be used to remove heat from a catalyst particle bed, in accordance with the invention.

FIGS. 3 to 5 show alternative versions of cooling devices which can be used to remove internal heat from the dewaxed catalyst particle bed, in accordance with the invention. Parts of the cooling devices of FIGS. 3 to 5 which are the same as, or similar to, those of the cooling device of FIG. 2, are indicated with the same reference numerals.

Thus, FIG. 3 shows a serpentine coil 50 comprising convoluted tubes 52; FIG. 4 shows a composite dimple plate cooling device 60 having dimpled plates 62 between which cooling water can pass; and FIG. 5 shows a finned tube heat exchanger 70 having longitudinally extending circumferentially spaced fins 72 on its tubes 52.

EXAMPLES

Example 1

Comparative

A 20 m % Co on alumina catalyst, also containing platinum, with a particle size between 40 and 200 micron was used in the slurry phase Fischer-Tropsch synthesis process for an extended period of time, thus becoming a spent FTS catalyst.

This spent wax-coated catalyst was regenerated by means of the following process:

The spent wax-coated catalyst was dewaxed by means of a hot xylene washing step at a temperature of 80° C. The excess xylene was decanted and the remaining wet catalyst was dried at 100° C. for 2 hours at atmospheric pressure. The dewaxed spent catalyst contained about 10 m % carbon/residual wax and was in the form of a dry powder.

Figure 6:
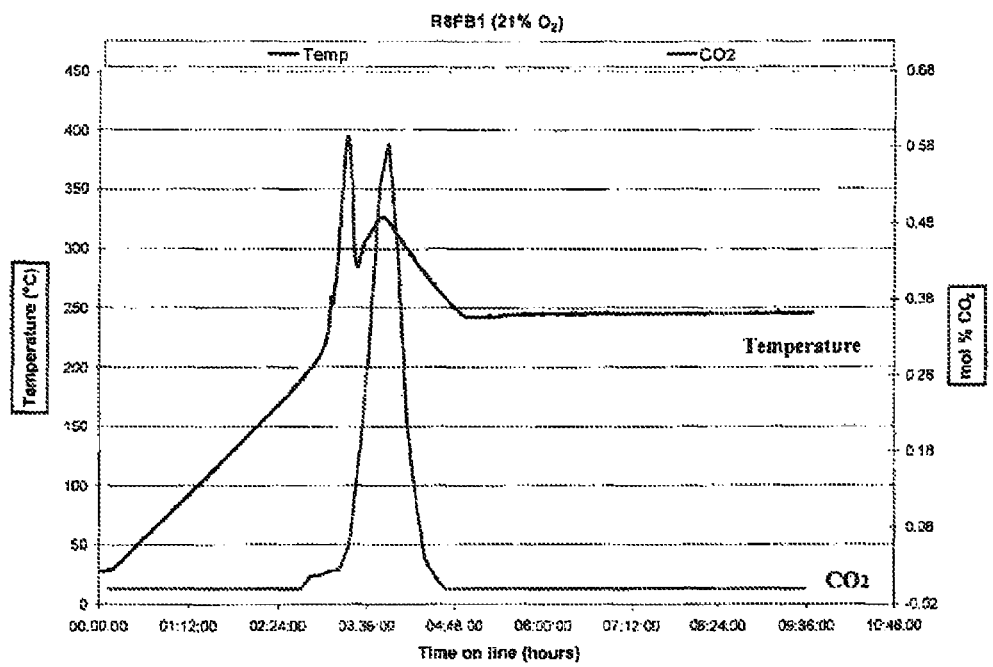
FIG. 6 shows an exotherm for the oxidation treatment during the regeneration of a spent particulate wax-containing cobalt-based Fischer-Tropsch synthesis catalyst, i.e. a spent wax-containing or wax-coated catalyst, on laboratory scale in accordance with comparative Example 1.

On laboratory scale, 10 grams of this dewaxed spent catalyst containing about 10 m % of wax and carbon, was oxidized in a laboratory reactor unit using an airflow of 300 ml$_n$/min, a heating rate of the heater of 1° C./min to 250° C. and a subsequent hold time of 6 hours at 250° C., which resulted in a cycle time of about 9 hours. The catalyst particles were thus in a fluidized bed during the oxidation treatment. As air was used, the oxygen concentration was thus 21 vol %. The air and the reactor unit were heated simultaneously and at the same rate by means of electrical heaters. During the oxidation treatment the aim was to maintain a constant temperature ramp rate during the temperature ramp period and control the temperature at 250° C. during the hold time. The catalyst bed temperature is shown in FIG. 6. It can be seen that the oxidation of the wax, carbon and metallic cobalt caused the temperature to rise quickly and uncontrollably from about 200° C. to almost 400° C. $CO_2$ was determined in the off gas of the reactor, showing that oxidation of carbon/wax to $CO_2$ did occur.

About 10 grams of the oxidized catalyst was reduced on laboratory scale in hydrogen at atmospheric pressure using a heating rate of 1° C./min from room temperature to 425° C. and kept at 425° C. for 8 hours, and a hydrogen space velocity of 1500 ml$_n$/g cat/h. Thereafter the catalyst was cooled down to 140° C. and poured into molten wax. The molten wax/catalyst mixture was cooled down to room temperature.

This laboratory scale experiment showed that the catalyst bed temperature can increase quickly from about 200° C. to almost 400° C., although on laboratory scale a significant proportion of the heat is removed with the gas and via the reactor walls. Using these laboratory scale data the expected temperature increase was calculated for a commercial regeneration process using, for example, 1000 kg of spent catalyst. It was calculated, assuming adiabatic behaviour that the expected temperature rise is from about 200° C. to at least 1000° C. It is well known that a temperature increase of this nature (i) will damage the catalyst beyond repair, (ii) will damage the equipment if it was not designed for this kind of temperature, and (iii) will pose a safety risk if equipment fails. It is thus important to be able to control the exotherm during the oxidation step.

Example 2

Comparative

Figure 7:
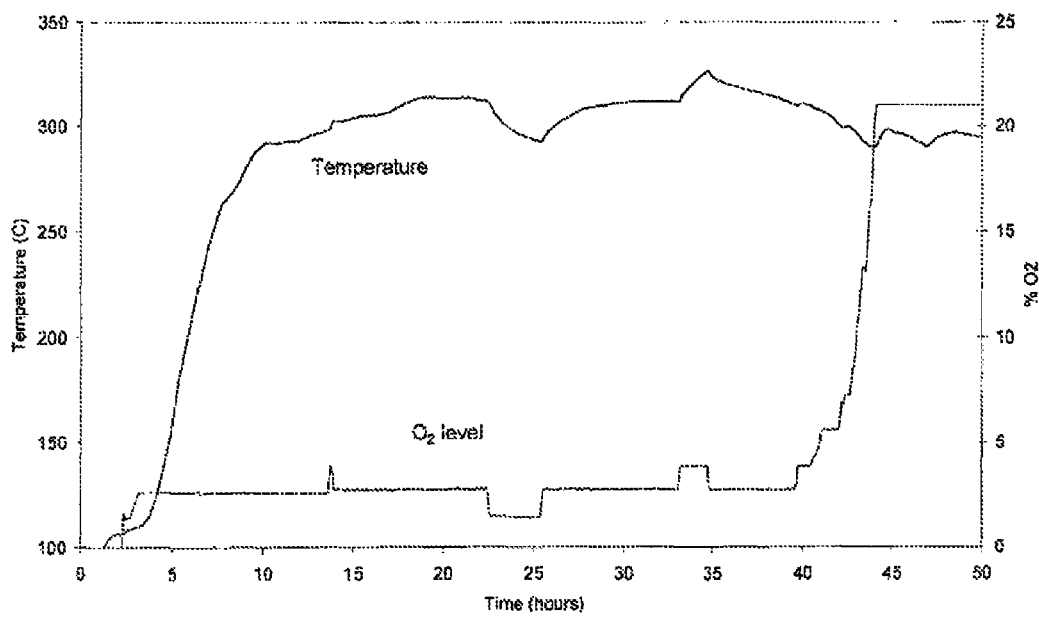
FIG. 7 shows the temperature and oxygen level for the oxidation treatment during the regeneration of a spent particulate wax-containing cobalt-based Fischer-Tropsch synthesis catalyst on pilot plant scale in accordance with comparative Example 2.

Regeneration of the same spent wax-coated catalyst as was used in Example 1, was carried out in the same fashion as in Example 1, apart from the oxidation step which comprised the following (sample B4):

6 kg of the dewaxed spent catalyst containing about 10 m % of wax and carbon, was oxidized in a fluidized bed reactor unit using a flow of 3 vol % oxygen in nitrogen of about 1.3 m³$_n$/hour, a heating rate of the heater of 1° C./min to 300° C. and a hold time at 300° C. The catalyst particles were thus in a fluidized bed during the oxidation treatment. The oxygen concentration was maintained at 3 vol % for most of the oxidation process. The aim was to control the catalyst bed temperature by keeping the oxygen concentration low during the temperature ramp as well as during the hold time at 300° C. during the oxidation treatment. The catalyst bed temperature is shown in FIG. 7. The gas was pre-heated to about 150° C., and the reactor unit was also heated up by means of electrical heaters in the reactor unit walls. It can be seen that when the oxygen concentration was increased from 3 to 4 vol % for a short while, i.e. after 33 hours in the experiment, the temperature of the catalyst bed increased, whereafter the oxygen concentration was decreased to 3 vol % again. Only after 40 hours could the oxygen level be increased from 3 to 21 vol %, showing that the oxidation process was finished. The complete oxidation process thus took 40 hours.

Although the temperature was well controlled in this example, by means of the low oxygen concentration, the cycle time (i.e. 40 hours) of this example for exceeded that of laboratory example (i.e. 9 hours).

Example 3

In Accordance with the Invention

Figure 8:
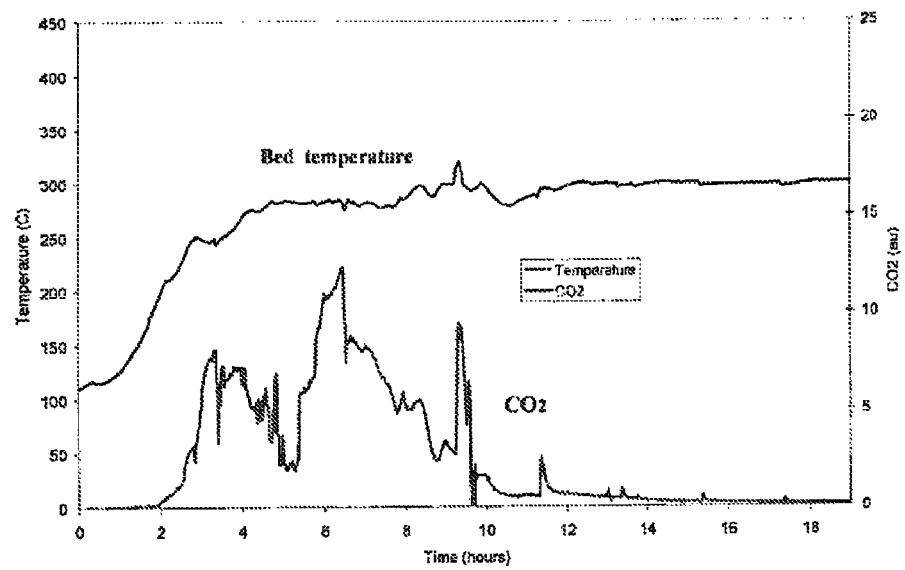
FIG. 8 shows the temperature and carbon dioxide level for the oxidation treatment during the regeneration of a spent particulate wax-containing cobalt-based Fischer-Tropsch synthesis catalyst on pilot plant scale in accordance with Example 3 (which is in accordance with the invention)

Regeneration of the same spent wax-coated catalyst as was used in Example 1, was carried out in the same fashion as in Example 1, apart from the oxidation step which comprised the following (sample B12):

6 kg of the dewaxed spent catalyst containing about 10 m % of wax and carbon, was oxidized in a fluidized bed reactor unit using an gasflow of about 2.4 m³$_n$/hour, a heating rate of the heater of 0.7° C./min to 300° C. and a hold time at 300° C., at atmospheric pressure. The catalyst particles were thus in a fluidized bed during the oxidation treatment. The oxygen concentration was increased from 0 vol % to 21 vol %, in a linear fashion, within the first 5 hours. The aim was to control the catalyst bed temperature during the temperature ramp as well as during the hold time at 300° C. during the oxidation treatment. The catalyst bed temperature is shown in FIG. 8. The gas was pre-heated to about 150° C., and the reactor unit was also heated up by means of electrical heaters in the reactor unit walls.

Internal heat removal was achieved by using ¼" (6 mm) copper tubing cooling coils 40 (see FIG. 2), through which cooling water passed. The inlet temperature of the water was 25° C. and the outlet was steam at 185° C.

After about 15 hours in the oxidation process, the $CO_2$ level in the outlet gas had decreased to almost zero indicating the end of the oxidation process.

As can be seen from FIG. 8, catalyst temperature could be controlled excellently with the internal cooling coil heat removal system, while achieving a cycle time of less than 15 hours. This is a large improvement compared to the cycle time of 40 hours for comparative Example 2. This 15 hour cycle time is close to the cycle time of the laboratory scale experiment, but now with excellent heat removal and temperature control.

The reduced regenerated catalyst (reduced in the same manner as set out in Example 1) was tested for Fischer-Tropsch synthesis performance at 230° C., at 17 bar(a) or 1700 kPa(a) total pressure, $H_2$+CO space velocity of 3934 ml$_n$/g Cat/h, $H_2$/CO inlet ratio of 1.6, and 10 vol % argon as internal standard (run BE074). The reduced regenerated catalyst showed a satisfactory conversion of 61% (34 hrs online) and a satisfactory FT rate of 9.92E-6 mol CO converted/g catalyst/sec.

Example 4

In Accordance with the Invention

Figure 9:
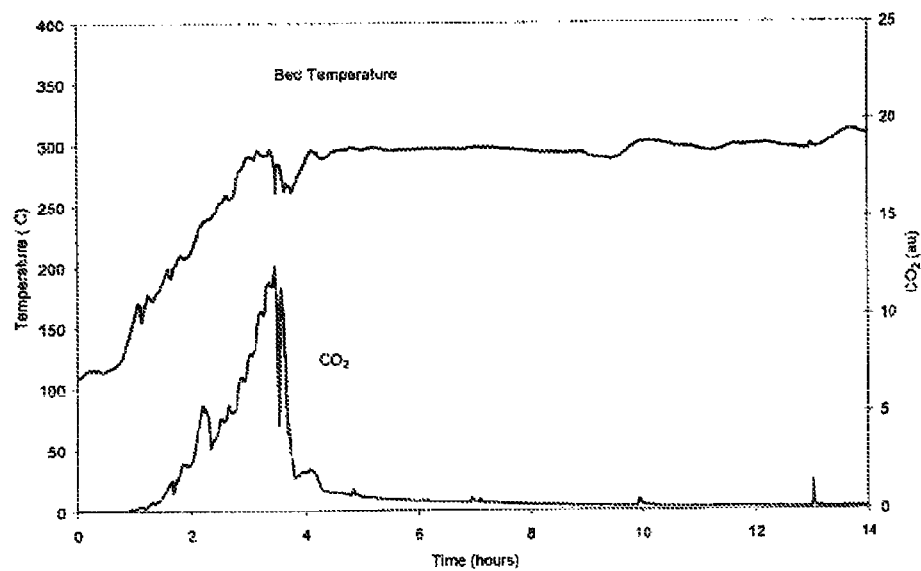
FIG. 9 shows the temperature and carbon dioxide level for the oxidation treatment during the regeneration of a spent particulate wax-containing cobalt-based Fischer-Tropsch synthesis catalyst on pilot plant scale in accordance with Example 4 (which is in accordance with the invention).

Regeneration of the same spent wax-coated catalyst as was used in Example 1, was carried out in the same fashion as in Example 1, apart from the oxidation step which comprised the following (sample B14):

6 kg of the dewaxed spent catalyst containing about 10 m % of wax and carbon, was oxidized in a fluidized bed reactor unit using an gasflow of about 10 m$^3$$_n$/hour, a heating rate of the heater of 1° C./min to 300° C. and a hold time at 300° C., and a pressure of 9 bar(a) or 900 kPa(a). The catalyst particles were thus in a fluidized bed during the oxidation treatment. The oxygen concentration was increased from 0 vol % to 21 vol %, in a linear fashion, within the first 3.5 hours. The aim was to control the catalyst bed temperature during the temperature ramp as well as during the hold time at 300° C. during the oxidation treatment. The catalyst bed temperature is shown in FIG. 9. The gas was pre-heated to about 150° C., and the reactor unit was also heated up by means of electrical heaters in the reactor unit walls.

Internal heat removal was achieved by using ¼ " (6 mm) copper tubing cooling coils 50 (see FIG. 2), through which cooling water passed. The inlet temperature of the water was 25° C. and the outlet was steam at 185° C.

After about 10 hours in the oxidation process, the $CO_2$ level in the outlet gas had decreased to almost zero indicating the end of the oxidation process.

As can be seen from FIG. 9, the catalyst temperature could be controlled excellently with the internal cooling coil heat removal system, while achieving a cycle time of about 10 hours. This is a large improvement compared to the cycle time of 40 hours for comparative Example 2. This 10 hour cycle time achieved at a pressure of 9 bar(a) is also shorter than that obtained in Example 3 at atmospheric pressure, while still maintaining an excellent heat removal and temperature control.

The reduced regenerated catalyst (reduced in the same manner as set out in Example 1) was tested for Fischer-Tropsch synthesis performance at 230° C., at 17 bar(a) or 1700 kPa(a) total pressure, $H_2$+CO space velocity of 3858 ml$_n$/g cat/h, $H_2$/CO inlet ratio of 1.6, and 10 vol % argon as internal standard (run BF056). The reduced regenerated catalyst showed a satisfactory conversion of 63% (23 hrs online) and a satisfactory FT rate of 9.97E-6 mol CO converted/g catalyst/sec.

The invention claimed is:

1. A process for regenerating a spent particulate wax-containing cobalt-based Fischer-Tropsch synthesis catalyst, which process includes subjecting the spent wax-containing catalyst sequentially to
    (i) a dewaxing treatment during which the spent wax-containing catalyst is at least partially dewaxed, with dewaxed catalyst particles being produced;
    (ii) an oxidation treatment which comprises passing an oxygen-containing gas through a bed of the dewaxed catalyst particles at an operating temperature T° C. where 150<T<450, and controlling the operating temperature by removing heat from the catalyst particle bed using a cooling device comprising cooling medium passage means and a cooling medium passing through the passage means, thereby providing heat transfer surfaces located in and/or around the catalyst bed, to obtain oxidized catalyst particles; and
    (iii) a reduction treatment which comprises reducing the oxidized catalyst particles, thereby regenerating the catalyst.

2. A process according to claim 1, wherein the oxidation treatment includes controlling T° C. to remain within a 40° C. range.

3. A process according to claim 1, which includes, in respect of the oxidation treatment, heating the catalyst particle bed up to the operating temperature T° C., while passing the oxygen-containing gas through the bed.

4. A process according to claim 3 wherein, in respect of the oxidation treatment, the catalyst particle bed is at a temperature between 25° C. and 400° C., when heating of the bed commences.

5. A process according to claim 3, wherein the heating up of the catalyst particle bed is effected by means of heat derived from the exothermic oxidation reaction of the catalyst particles and/or by means of additional heat imparted to the catalyst particle bed.

6. A process according to claim 5, wherein the heating up of the catalyst particle bed includes heating it by means of the additional heat, with the additional heat being supplied by pre-heating the oxygen-containing gas before it passes into the catalyst particle bed.

7. A process according to claim 1 wherein, during the oxidation treatment, the oxygen-containing gas is passed through the bed at a velocity so that the catalyst particle bed is fluidized.

8. A process according to claim 7 wherein, during the oxidation treatment, the dewaxed catalyst particles are subjected to fluidization in a reaction chamber, using a space velocity of from 100 to 20000 mln gas/g catalyst/hour, with the temperature of the catalyst particles increasing at a rate of from 0.1 to 10° C./min, up to the operating temperature T° C.

9. A process according to claim 1, wherein the oxygen-containing gas that is used in the oxidation treatment contains more than 3% vol oxygen.

10. A process according to claim 1, wherein the oxygen level of the oxygen-containing gas that is used in the oxidation treatment is varied during the oxidation treatment, starting at a low oxygen concentration of about 1 vol %, and increasing it to at least about 21 vol %.

11. A process according to claim 1, wherein the dewaxing treatment includes hydrogenolysis; solvent wash or extraction; solvent wash or extraction followed by hydrogenolysis; drying; or stripping in an inert medium.

12. A process according to claim 1, which includes, after the dewaxing treatment and before the oxidation treatment, passivating the dewaxed catalyst particles by oxidizing the outer cobalt layers on the catalyst particles, thereby rendering the dewaxed catalyst particles safe to handle.

13. A process according to claim 1, which includes subjecting the regenerated catalyst to at least one further regeneration cycle comprising a further oxidation treatment which comprises, while passing an oxygen-containing gas through a bed of the catalyst particles, heating the catalyst particle bed up to an operating temperature T° C. where $150<T<450$, and controlling the temperature of the catalyst particle bed by removing heat from the catalyst particle bed using a cooling device, to obtain oxidized catalyst particles, and a further reduction treatment which comprises reducing the oxidizing catalyst particles, thereby further regenerating the catalyst.

14. A Fischer-Tropsch synthesis process comprising regenerating a spent particulate wax-containing cobalt-based Fischer-Tropsch synthesis catalyst according to the process of claim 1, to obtain a regenerated particulate cobalt-based Fischer-Tropsch synthesis catalyst; and contacting hydrogen with carbon monoxide at a temperature above 100° C. and at a pressure of at least 10 bar in the presence of the regenerated particulate cobalt-based Fischer-Tropsch synthesis catalyst, thereby producing hydrocarbons and, optionally, oxygenates of hydrocarbons.

15. A process according to claim 14, which includes subjecting the hydrocarbons and, if present, the oxygenates of hydrocarbons, to hydroprocessing, thereby to covert them to liquid fuels and/or to chemicals.

* * * * *